United States Patent
Mitra et al.

(10) Patent No.: US 7,068,210 B1
(45) Date of Patent: Jun. 27, 2006

(54) LOW-COST POSITION-ADAPTIVE UAV RADAR DESIGN WITH STATE-OF-THE-ART COTS TECHNOLOGY

(75) Inventors: Atindra K. Mitra, Beavercreek, OH (US); Krishna Pasala, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 11/070,403

(22) Filed: Feb. 25, 2005

(51) Int. Cl.
*G01S 13/88* (2006.01)
*G05D 1/00* (2006.01)
*B64C 27/04* (2006.01)

(52) U.S. Cl. .............. 342/63; 342/21; 342/27; 342/61; 342/62; 342/66; 342/118; 342/175; 342/195; 701/1; 701/3; 244/17.11; 244/17.13

(58) Field of Classification Search .......... 244/3.1–3.3, 244/17.11–17.27; 342/22, 27, 28, 61–65, 342/118, 119, 128–132, 134–137, 175, 195, 342/21; 701/1–18, 300, 301
See application file for complete search history.

(56) References Cited

U.S. PATENT DOCUMENTS

| | | | |
|---|---|---|---|
| 3,053,480 A * | 9/1962 | Vanderlip | 244/17.13 |
| 3,794,273 A * | 2/1974 | Girard | 244/17.19 |
| 4,818,990 A * | 4/1989 | Fernandes | 701/2 |
| 6,653,970 B1 | 11/2003 | Mitra | |
| 6,690,318 B1 | 2/2004 | Tsunoda | |
| 6,724,340 B1 | 4/2004 | Carlos et al. | |
| 6,727,841 B1 * | 4/2004 | Mitra | 342/22 |

FOREIGN PATENT DOCUMENTS

| FR | 2657788 A1 * | 8/1991 |
|---|---|---|
| FR | 2716433 A1 * | 8/1995 |
| FR | 2849981 A1 * | 7/2004 |

* cited by examiner

*Primary Examiner*—Bernarr E. Gregory
(74) *Attorney, Agent, or Firm*—AFMCLO/JAZ; Gina S. Tollefson; Gerald B. Hollins

(57) ABSTRACT

A position-adaptive radar method and device for small UAV platforms capable of detecting "leakage signals" that, for example, propagate between two buildings or "leak through" penetrable surfaces such as walls or layers of the ground. The position-adaptive radar comprises a monostatic radar receiver that measures and processes leakage signals and then "self adapts" in position to establish line-of-sight between a mini-UAV platform and an obscuration channel that propagates the leakage signal. This allows a mini-UAV platform to process signals in real-time while gathering intelligence information and locating objects-of-interest that may be embedded within an obscuration channel.

20 Claims, 3 Drawing Sheets

LOW-COST POSITION-ADAPTIVE UAV RADAR DESIGN WITH STATE-OF-THE-ART COTS TECHNOLOGY

The invention described herein may be manufactured and used by or for the Government of the United States for all governmental purposes without the payment of any royalty.

BACKGROUND OF THE INVENTION

The invention relates to on-board radar for mini unmanned air vehicles and more specifically to position-adaptive on-board radar for mini unmanned air vehicles in urban environments.

Low-altitude "robotic" mini unmanned air vehicle technology has important applications for emerging and future threat scenarios in hard urban environments where, for example, "objects of interest" may be concealed between buildings. Other challenging environments and scenarios include surveillance and interrogation of regions-of-interest that may be embedded within mountainous terrain.

The current state-of-the-art for sensors on mini-UAV helicopter platforms are generally video cameras. While video technologies for remote sensing and surveillance have many useful applications, they are not useful for embedded or obscured objects. The present invention is a low-cost lightweight radar system that allows for information gathering for special applications such as in embedded environments (i.e. inside buildings), detection and characterization of hidden and obscured targets (i.e. between buildings), as well as potential for detection and pre-characterization of very small and slow-moving man-made and biological threats that, to date, have not been detected with currently available prior-art sensor technologies.

SUMMARY OF THE INVENTION

A position-adaptive radar method and device for small UAV platforms capable of detecting "leakage signals" that, for example, propagate between two buildings or "leak through" penetrable surfaces such as walls or layers of the ground. The position-adaptive radar comprises a monostatic radar receiver that measures and processes leakage signals and then "self adapts" in position to establish line-of-sight between a mini-UAV platform and an obscuration channel that propagates the leakage signal. This allows a mini-UAV platform to process signals in real-time while gathering intelligence information and locating objects-of-interest that may be embedded within an obscuration channel.

These and other objects of the invention are achieved by the description, claims and accompanying drawings and by an on-board based instrumentation system for position-adaptive convergence of a mini-UAV helicopter between two structures comprising:

a mini-UAV helicopter;

a positional control system;

a close-range monostatic radar system for transmitting, receiving and processing a radar signal (in real time); and a system controls processor for interfacing said radar system with said positional control system and wherein said controls processor iteratively controls the location of the helicopter in real-time;

wherein large range values from said close-range monostatic radar system correspond to leakage points and wherein said leakage points correspond to lower values of signal attenuation and higher values of medium penetration, and whereby the mini-UAV helicopter converges and hovers at said leakage point.

DETAILED DESCRIPTION

Figure 1:
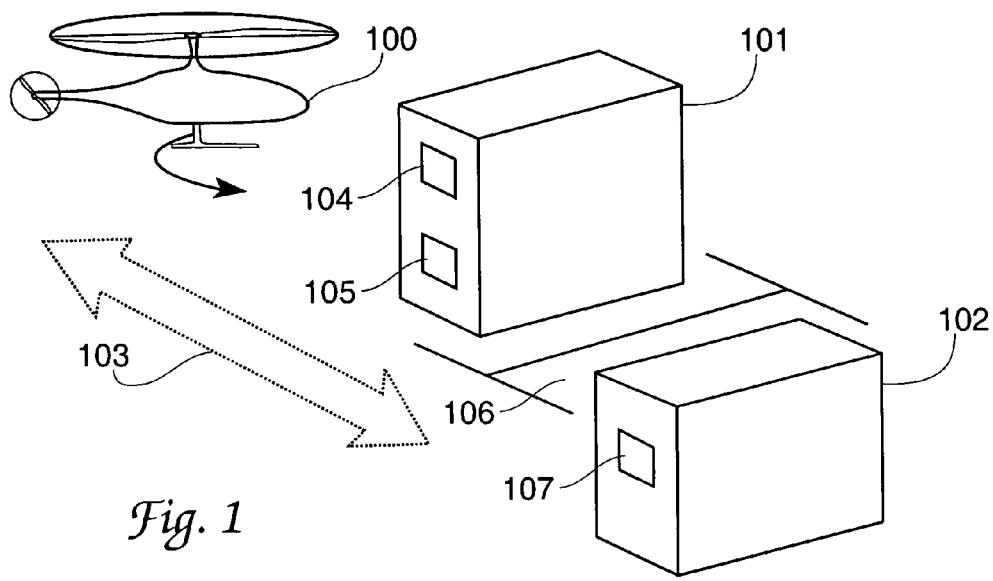
FIG. 1 is a position-adaptive radar concept for mini-UAV helicopter according to the invention.

FIG. 1 illustrates a position-adaptive concept for a mini-UAV helicopter according to the invention. The preferred arrangement of the invention is a close-range monostatic radar design concept where the radar is interfaced to the positional control system on the mini-UAV via a system controls processor. FIG. 1 depicts a situation where a helicopter 100 laterally hovers back and forth, illustrated by the arrow at 103, in front of the two buildings, 101 and 102, while transmitting, receiving, and processing (in real-time) a radar signal. Depending on the characteristics of the radar signal, the on-board control processor iteratively controls the location of the helicopter in real-time. This "smart sensor-based" approach to real-time controls allow the helicopter to isolate "signal leakage points" within the desired region-of-interest. For illustrative purposes, four notional leakage points are shown in FIG. 1; two signal leakage points, 104 and 105, in front of building 101, one signal leakage point, 106, between buildings 101 and 102, and one signal leakage point, 107, in front of building 102.

The illustration in FIG. 1 can also be interpreted as a model for measurements and testing of the radar-based sensor controls. For example, the sensor design can be prototyped and tested by constructing a scaled-model of the environmental configuration in FIG. 1 and by implementing a few simple approaches to on-board and real-time sensor control. Additionally, a control algorithm that iteratively measures and compares radar range values can be used to position-adaptively control the helicopter platform. With approach, relatively large values of range measurements from the on-board radar (as a function of lateral helicopter trajectory) correspond to "leakage points-of-interest" since these locations correspond to lower values of signal attenuation and higher levels of penetration through the medium. Under this concept, real-time onboard iterative comparison of the range values allows the helicopter to "converge" or hover in front of the leakage points and, for example, form an image of potential objects-of-interest by exploiting the "line-of-sight" signal propagation between the helicopter platform through the leakage points.

A preferred arrangement of the invention can be demonstrated by implementing a system that position-adaptively converges to leakage points by processing onboard radar signals and then using a small onboard camera to generate a line-of-sight photographic image of potential objects-of-interest. The system can be re-programmed and upgraded with more sophisticated processing techniques that apply under more severe conditions by, for example, deploying a tier of mini-UAV's that each process additional signal information such as phase discontinuities in the signal. A tier of mini-UAV's operate to converge to leakage points from a variety of different aspect angles. This multi-aspect information can then be combined via communications links between the platforms to arrive at a multi-dimensional approach to collecting intelligence information in a number of challenging environments.

For the position-adaptive radar method and device of the invention, the radar analysis and design is based on state-of-the-art ultra-wideband (UWB) impulse radar technology. A frequency range for a preferred arrangement of the invention is selected from about 100 MHz to 2 GHz and is derived from recent advances in MIR (Micro Impulse Radar) COTS (Commercial-Off-The-Shelf) technologies. Many existing MIR implementations have range limits of a few feet. Some potential future application areas of this promising "tiny low-cost radar-on-a-chip" technology can be categorized into automotive, security, home appliance, and manufacturing. A number of specific implementations have been developed including COTS modules for fluid level sensing and motion detection.

Figure 2:
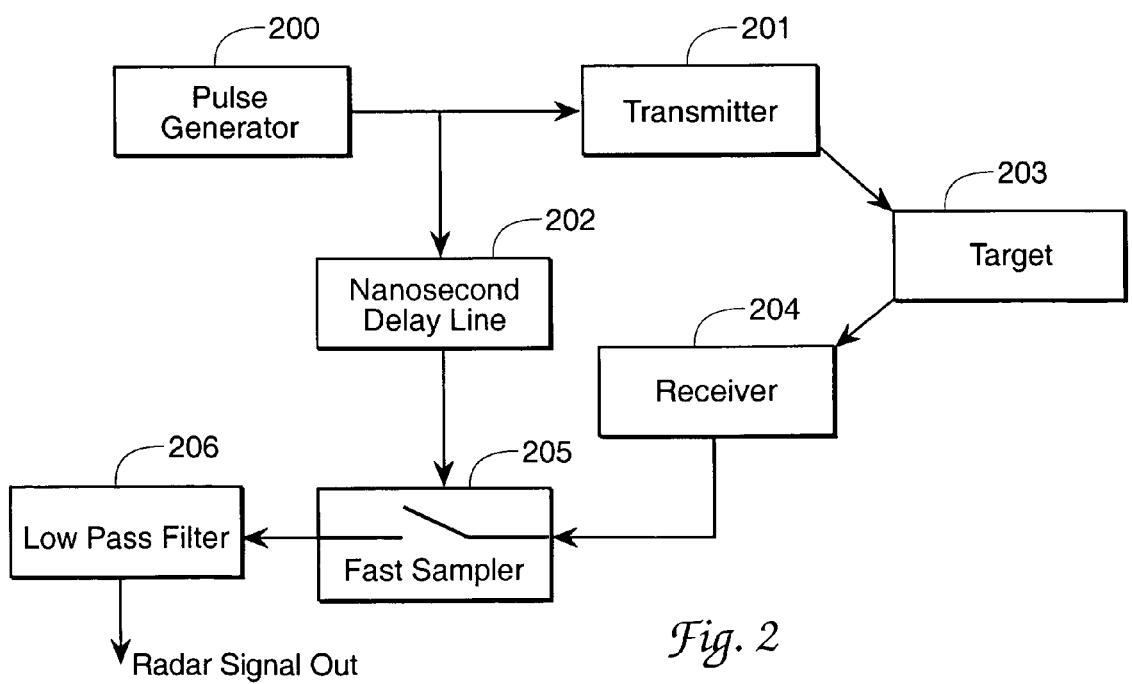
FIG. 2 is a block diagram for impulse radar design according to the invention.

FIG. 2 is a block diagram of an impulse radar design for a preferred arrangement of the invention. The radar detection principle for this arrangement of the invention is based on correlating a delayed version of the transmit pulse train with the backscattered pulse train to generate a coherent radar signal output. The transmit signal 201 is coded within a relatively simple pulse generator circuit 200 that applies a "white noise" pulse-position modulation (PPM) signal to a 2 MHz pulse train. The transmitter 201 shapes the pulse from the pulse generator into a short impulse and irradiates the region-of-interest or target 203 with RF energy. The receiver 204 detects the backscattered RF energy from the region-of-interest or target 203. The nanosecond delay line 202, fast sampler circuit 205, and low-pass filter 206 function in tandem as an efficient and synchronous analog cross-correlation function between the transmitted ultra-wideband signal and the received signal. Synchronous cross-correlation of ultra-wideband signals generates very precise measurements of basic radar quantities such as range and Doppler.

A set of design calculations can be performed via a link-budget analysis using Eqs. (1)–(4). These equations serve as radar range equation models in voltage form. The information from the results of this type of link-budget analysis can be used to specify components.

$$S/N = \frac{V_r}{V_n} \qquad \text{Eq. (1)}$$

$$V_r = \frac{V_t G \lambda \sigma^{1/2}}{(4\pi)^{3/2} R^2} \qquad \text{Eq. (2)}$$

$$V_n = \frac{(4kTB_{RF}R_{det})^{1/2}}{N^{1/2}} \qquad \text{Eq. (3)}$$

$$N = \tau(PRF) \qquad \text{Eq. (4)}$$

In Equations (1)–(4), S/N denotes signal-to-noise ratio, $V_r$ represents the received signal voltage, $V_n$ is noise voltage, $V_t$ is the peak transmitter voltage, G is antenna gain, $\lambda$ is the wavelength at center frequency, $\sigma$ is radar cross-section of detection object-of-interest, R is radar range, k is Boltzman's constant, T is temperature, $B_{RF}$ is signal bandwidth, $R_{det}$ represents ohmic losses in the detector, N is number of integration pulses in the receiver, $\tau$ is the integration time, and PRF is the pulse repetition frequency of the impulse radar.

Figure 3:
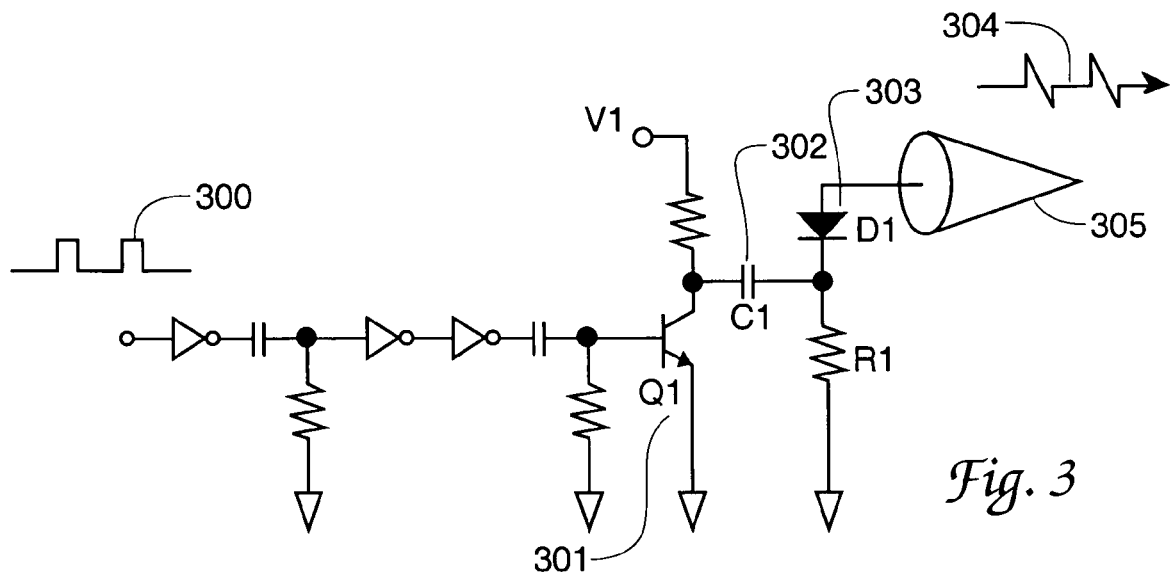
FIG. 3 is is a conceptual circuit model for impulse radar transmitter according to the invention.

FIG. 3 shows a conceptual circuit model and is useful for purposes of visualizing the design analysis of the arrangement of the invention. FIG. 3 illustrates the impulse generation and transmission process where a short pulse 300 is generated at the base of the microwave transistor, Q1 illustrated at 301. This short pulse has the effect of saturating the transistor into a conduction state and generating a fast discharge of capacitor, C1, illustrated at 302, through the transistor and the Schottky diode, D1, illustrated at 303. This discharge process results in the radiation of a short impulse waveform 305 from the antenna 305.

Two sets of design calculations were performed using Equations (1)–(4). For the first set of calculations, a signal-to-noise ratio of 13 dB for selected for a $\sigma=1$ m$^2$ object at a maximum range, R, of 100 m. The antenna gain, G, was set at 5 dB and the detection resistance, $R_{det}$, was approximated at 100 ohms. This leads to a pulse integration number of about 2000 and a baseband receiver signal bandwidth of about 250 Hz. These parameters correspond to a radar design in an open ("free space") environment where the maximum detection range is 100 m.

A second set of design calculations were performed by using the same basic design parameters (as the first set of calculations) except by adding an additional loss term estimate due to ½ meter building penetration. These calculations were performed by using the signal voltage values from the first set of calculations, incorporating a loss term estimate, and "backsolving" Equation 2 for the range term, R. The loss term was estimated using Equation (5).

$$P_L = 20 \log\left(\frac{c}{4\pi d f}\right) \qquad \text{Eq. (5)}$$

This equation was evaluated with penetration depth d=0.5 m at a center frequency of f=1 GHz. This leads to a loss estimate of about 25 dB. The resulting range term, R, was about 25 m.

Figure 4:
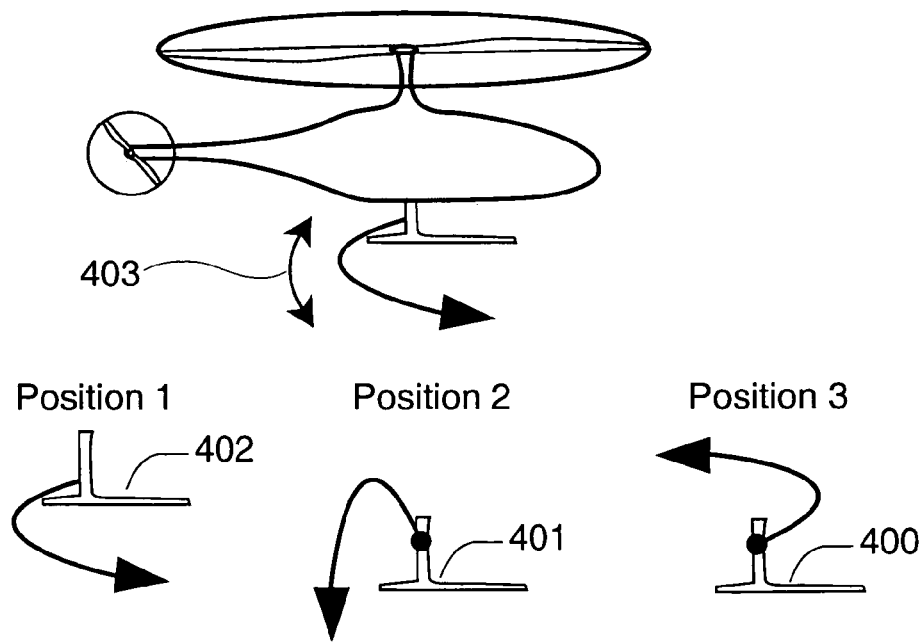
FIG. 4 is a retractable dual spiral antenna concept for mini-UAV helicopter according to the invention.

FIG. 4 illustrates the antenna concept for the position-adaptive mini-UAV radar device and method of the invention. This is a lightweight design where a two-arm spiral is fabricated over styrofoam-type material. This is a two-antenna design where one antenna is bracketed to the left side of the helicopter and the other antenna is bracketed to the right side of the helicopter. One antenna is a transmitting antenna and the other antenna is a receiving antenna. The position of the antennas can be controlled for landing 400 where the antennas are retracted (into a "back-looking" position) via a electronic control mechanism. In addition, the depression angle of the antennas can be adjusted between "down-looking" 401 and "forward-looking" 402.

The frequency response of these antennas are approximately related to the front and back diameters of the antenna's conical section by the following expression.

$$\frac{f_{max}}{f_{min}} \approx \frac{D_{max}}{D_{min}} \qquad \text{Eq. (6)}$$

where $f_{max}$=2 GHz and $f_{min}$=100 MHz defines the upper and lower frequency limits of this position-adaptive radar design. This 20:1 "aspect ratio" can be implemented by, for example, selecting the diameter of the large end of the conical section, $D_{max}$ as 30 cm and the diameter of the small end of the conical section $D_{min}$ as 1.5 cm. Then, selecting an typical cone angle of about 7.5 degrees leads to a antenna length of about 3.5 feet.

An approximate expression of the frequency dependent phase response of this type of conical spiral antenna is given in reference as:

$$\Psi(f) \approx -\frac{1}{\sin\theta}\left(\frac{1}{\cos\alpha} + \cos\theta\right)\left[\ln\left(\frac{f_{max}}{f}\right) + \left(\frac{f}{f_{max}} - 1\right)\right] \qquad \text{Eq. (7)}$$

where f represents frequency, θ represent cone angle, and α is denoted as the "wrap angle" for the spirals.

In order to minimize the distortion and ringing effects in the radiated and received impulse waveforms that propagate within these antennas, some relatively simple linear and quadratic approximations for phase inversion networks can be formulated in order to realize phase compensation functions that reduce the distortion effects from the fast impulse functions in this radar design.

Figure 5:
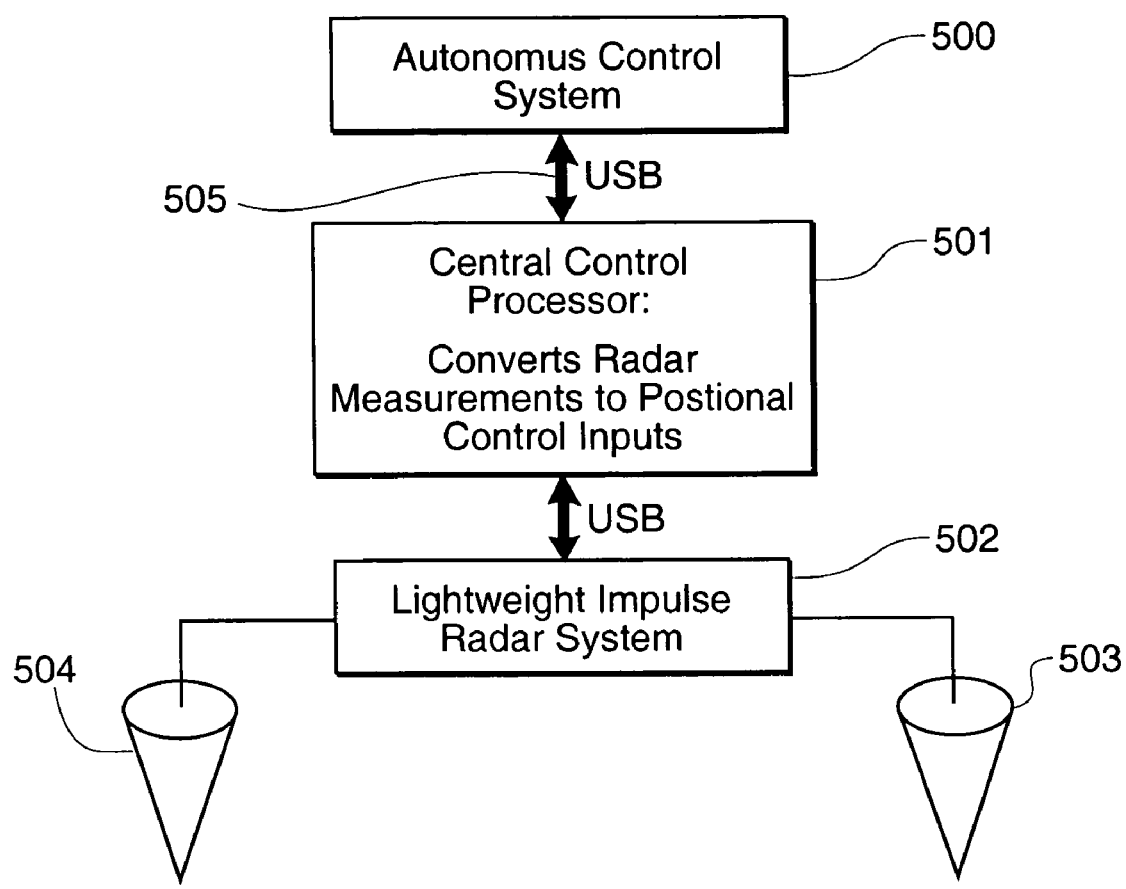
FIG. 5 is a basic block diagram of position-adaptive radar system for mini-UAV helicopter platform according to the invention.

FIG. 5 is a basic block diagram of position-adaptive radar system for mini-UAV helicopter platform according to the invention. The radar portion 502, 503, 504 of the preferred arrangement of the invention is based on ultra-wideband impulse radar technology. The lightweight and reconfigurable antenna design 503 504 allows for geometrical adjustment of the sensor look direction for a specific application. An integral part of this "smart sensor" concept is the development on a radar interface and system control module 501 for joint control and operation of the onboard radar system with the onboard autonomous control system 500. This "smart control module" 501 is designed so that the mini-UAV helicopter platform has the capability to "positionally-adapt" to characteristics of the "leakage signal" that is measured by the radar. This approach allows the mini-UAV to locate and gather information from different types of "obscuration channels".

While the apparatus and method herein described constitute a preferred embodiment of the invention, it is to be understood that the invention is not limited to this precise form of apparatus or method and that changes may be made therein without departing from the scope of the invention, which is defined in the appended claims.

What is claimed is:

1. An on-board based instrumentation system for position-adaptive convergence of an unmanned-air-vehicle helicopter between two structures comprising:
    an unmanned-air-vehicle helicopter;
    a positional control system;
    a close-range monostatic radar system for transmitting, receiving and processing in real-time a radar signal;
    a system controls processor for interfacing said radar system with said positional control system and wherein said controls processor iteratively controls the location of the helicopter in real-time;
    and wherein large range values from said close-range monostatic radar system correspond to leakage points and wherein said leakage points correspond to lower values of signal attenuation and higher values of medium penetration, said unmanned-air-vehicle helicopter converging and hovering at said leakage points.

2. The on-board based instrumentation system of claim 1 wherein said controls processor further comprises a control algorithm that iteratively measures and compares radar range values used to position-adaptively control said unmanned-air-vehicle helicopter.

3. The on-board based instrumentation system of claim 1 wherein said close-range mono-static radar system operates in a frequency range of between 100 MHz and 2 GHz.

4. The on-board based instrumentation system of claim 1 wherein said large-range values for said close-range monostatic radar system are a function of lateral helicopter trajectory.

5. The on-board based instrumentation system of claim 1 wherein said leakage point generates a line-of-sight signal propagation between the helicopter platform through the leakage points.

6. The on-board based instrumentation system of claim 5 further comprising an on-board camera to generate a line-of-sight photographic image of potential objects-of-interest.

7. The on-board based instrumentation system of claim 1 further comprising a plurality of unmanned-air-vechicle helicopters that each process additional signal information.

8. The on-board based instrumentation system of claim 7 wherein said additional signal information comprises phase discontinuities in the signal.

9. The on-board based instrumentation system of claim 7 wherein said plurality of unmanned-air-vehicle helicopters converge to leakage points from a variety of different aspect angles.

10. The on-board based instrumentation system of claim 1 wherein said antenna comprises a retractable dual antenna.

11. The on-board based instrumentation system of claim 1 wherein said antenna comprises a first and a second lightweight conical spiral antennas.

12. The on-board based instrumentation system of claim 11 wherein
    said first light weight conical spiral antenna is mounted on a first side of said helicopter with an adjustable light weight bracket; and
    said second light weight conical spiral antenna is mounted on a second side of said helicopter with an adjustable light weight bracket;
    and wherein said first antenna receives and said second antenna transmits.

13. An on-board based instrumentation system for position-adaptive convergence of a unmanned-air-vehicle helicopter between two structures comprising:
    a unmanned-air-vehicle helicopter;
    a positional control system;
    a close-range monostatic radar system for transmitting, receiving and processing a radar signal in real time comprising:
        a white noise pulse position modulation signal generated from a transmit signal coded with a relatively simple pulse generator circuit;
        a transmitter that shapes said white noise pulse position modulation signal into a short impulse and irradiates a region-of-interest with RF energy;
        a receiver for detecting and receiving backscattered RF energy from said region-of-interest; and a system controls processor for interfacing output from said receiver with said positional control system and wherein said controls processor iteratively controls the location of the helicopter in real-time based on output from said receiver;

and wherein large range values from said close-range monostatic radar system correspond to leakage points and wherein said leakage points correspond to lower values of signal attenuation and higher values of medium penetration and said unmanned-air-vehicle helicopter converging and hovering at said leakage points.

14. An on-board based instrumentation method for position-adaptive convergence of a unmanned-air-vehicle helicopter between two structures comprising the steps of:

providing a unmanned-air-vehicle helicopter;

providing a positional control system for said unmanned-air-vehicle helicopter; transmitting, receiving and processing a radar signal (in real-time) using a close-range monostatic radar system;

interfacing said radar system with said positional control system using a system controls processor wherein said controls processor iteratively controls the location of the helicopter in real-time; and corresponding large range values from said close-range monostatic radar system to leakage points and wherein said leakage points correspond to lower values of signal attenuation and higher values of medium penetration and said unmanned-air-vehicle helicopter converging and hovering at said leakage points.

15. The on-board based instrumentation method of claim 14 wherein said interfacing step further comprises interfacing said radar system with said positional control system using a system controls processor and a control algorithm that iteratively measures and compares radar range values used to position-adaptively control said unmanned-air-vehicle helicopter.

16. The on-board based instrumentation method of claim 14 wherein said corresponding step further comprises the step of corresponding large range values in the frequency range of between 100 MHz and 2 GHz to leakage points and wherein said leakage points correspond to lower values of signal attenuation and higher values of medium penetration.

17. The on-board based instrumentation method of claim 14 wherein said corresponding step further comprises the step of corresponding large range values in the frequency range of between 100 MHz and 2 GHz and are a function of lateral helicopter trajectory to leakage points and wherein said leakage points correspond to lower values of signal attenuation and higher values of medium penetration.

18. The on-board based instrumentation method of claim 14 wherein said step of providing a unmanned-air-vehicle helicopter further comprises the step of providing a plurality of unmanned-air-vehicle helicopters that each process additional signal information.

19. The on-board based instrumentation method of claim 18 wherein said providing step further comprises providing a plurality of unmanned-air-vehicle helicopters each processing phase discontinuity signal data.

20. The on-board based instrumentation method of claim 14 wherein said transmitting, receiving and processing further comprises the step of transmitting, receiving and processing using a retractable dual antenna.

* * * * *